Patented Nov. 10, 1953

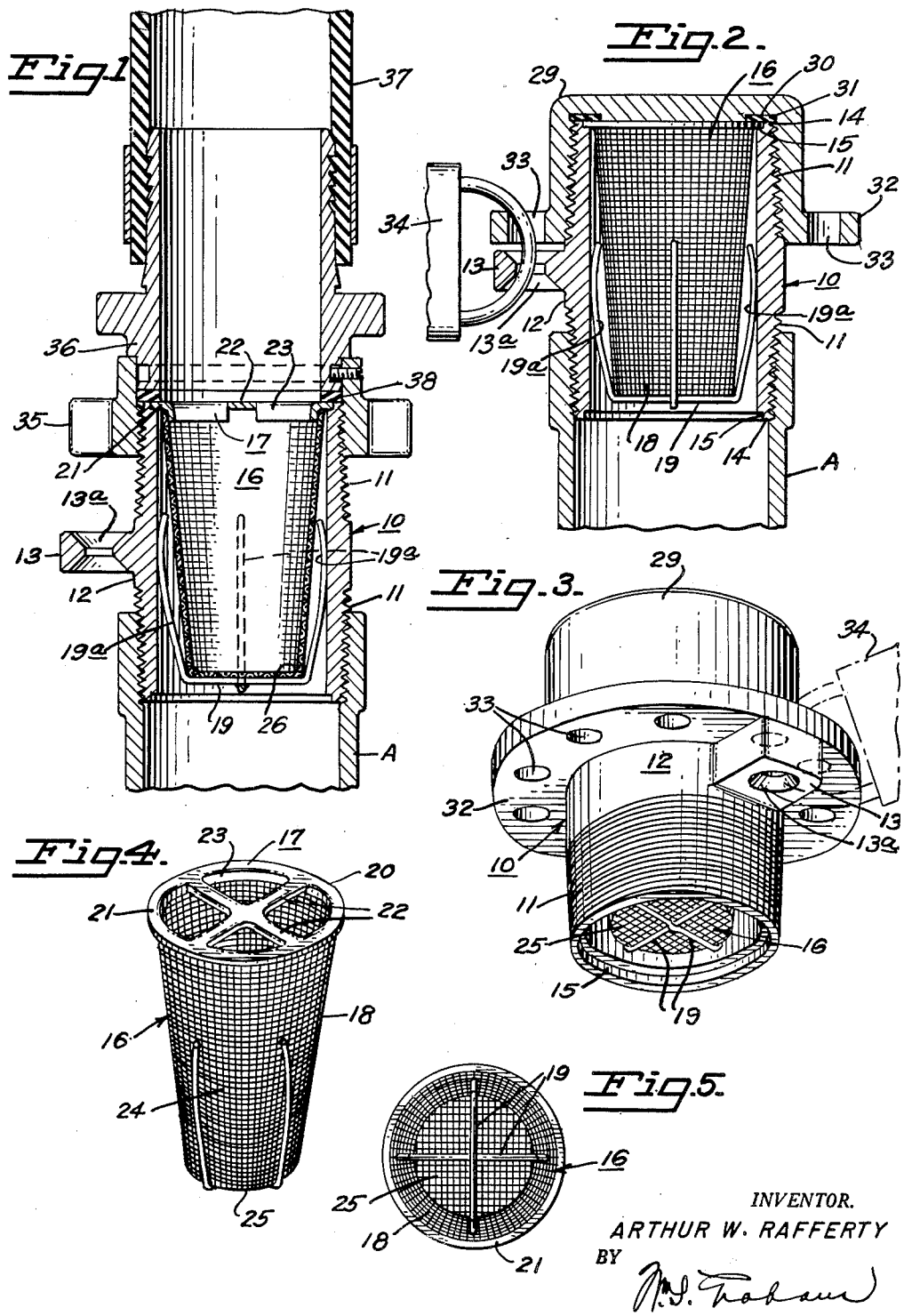

2,658,625

UNITED STATES PATENT OFFICE 2,658,625

HEADER STRAINER FOR LIQUID LINES

Arthur W. Rafferty, Sacramento, Calif.

Application August 2, 1948, Serial No. 42,063

4 Claims. (Cl. 210—170)

This invention relates to improvements in strainers for fluid lines, and more particularly relates to header strainers readily adaptable for installation in existing facilities of fluid lines without special tools.

There are many situations in transferring fluids from any bulk transport means, such as from tank cars, trucks or ships to a storage or industrial plant wherein no convenient strainer means are ordinarily provided between the bulk transport vehicle and the storage facilities. Occasions arise frequently wherein plant pumps are provided to pump incoming liquids to various storage tanks in which case, if insoluble foreign objects such as washers, nuts, rocks, chips, gravel and the like happen to get into the fluid line, they may wreck a pump or meter in transit of the fluid. Experience has shown that such foreign objects are not of infrequent occurrence in liquid conveying lines and that they are frequently the cause of serious damage to the pumping or metering system.

It is therefore highly desirable to provide a strainer means for removing foreign objects or matter from a liquid while being pumped, especially at the source of entry into a plant, since if such removal of foreign matter is removed at the source or entry to the plant the problem will not arise thereafter or if it does arrive it can be more readily traced to the point of origin and the fault corrected within the plant. The foregoing is merely one set of circumstances which make the present invention desirable, though there are many other analogous situations in which advantageous uses of the strainer assembly of the present invention are manifest.

Broadly, the object of the invention is to provide a simple efficient and economical strainer and fitting of wide range of adaptability for liquid conveying lines.

A further object is to provide a strainer assembly easy to install with use only of the usual tools conveniently present in plants where used, to provide a strainer not requiring rearrangement of existing piping, which is self-centering in its mounting, and which does not appreciably decrease the rate of flow, and is readily removable for cleaning.

Another object is to provide a fitting arranged and adapted for convenient use with such a strainer wherein the fitting serves as a support for the strainer and a seal member for cooperating with a cap or hose connection for the fluid line, and which may be reversed in its mounting to accomplish like purposes at either of its ends.

With the foregoing and other objects in view, which will be apparent from or further referred to in this specification, one form in which the invention may be exemplified is described herein and illustrated in the accompanying drawing, it being understood that changes of details by substitution of equivalents may be resorted to without departing from the spirit and scope of the invention which is defined in the appended claims.

In the drawing:

Fig. 1 is a vertical longitudinal central transverse section of the invention threadedly connected at one end to a pipe connection and coupled at the opposite end to a hose connection.

Fig. 2 is a vertical longitudinal central transverse section of the nipple of the invention, connected at one end to a pipe header and having a lockable closure cap at the opposite end, a strainer cup being shown in full lines.

Fig. 3 is a perspective view of the nipple and strainer therein and including the lockable cap member.

Fig. 4 is a perspective view of a strainer member of the invention.

Fig. 5 is a bottom view of strainer member shown in Fig. 4.

Referring to the drawing in which like reference characters indicate corresponding parts in the several views, and referring first to the fitting adapter, 10 indicates generally a nipple which is preferably similarly constructed at its opposite ends. In the present exemplification the nipple is illustrated as tapered at its opposite end portions from its central portion to terminal ends, each tapered portion being externally threaded as at 11. Interiorally the nipple is cylindrical and not tapered to correspond with the exterior threading. Centrally of its length between the opposite threaded end portions, the exterior of the nipple has an integral circumferential unthreaded band 12 which if desired, may be provided with a lug 13 extended radially outwardly and provided with an eyelet 13a therethrough for receiving a locking bar, as will be further described. The annular face of each of the terminal ends of the nipple is machined to a fine flat finish, as at 14, the nipple having an integral internal annular recess 15 immediately at each of said ends providing a shoulder for mounting a strainer.

A strainer member generally indicated 16 is provided for fitting in the nipple. For specification purposes the strainer may be described by its four integral parts, the head ring 17, the strainer cup body 18, and the reinforcing bottom cross bars 19 and resilient spring spacer members 19a.

The strainer head ring 17 comprises a circular ring member 20, the outside diameter of which is greater than the diameter of the end of a strainer cup body which is connected thereto, thereby providing a flange 21 extending radially outwardly beyond the top of the strainer cup body, its depth and outer diameter, respectively, being substantially for snug slidable clearance. Diametrically across the opening of the head ring 20 one or more cross bars 22 are provided, and where two are employed it is preferred that they be relatively perpendicular. Intermediate the outer ends of the cross bars, the ring member 20 is flanged downwardly as at 23 to provide a circumferential downturned flange to which the upper end of the reticulated strainer cup may be conveniently securely connected, as by soldering.

The strainer cup 18 has numerous openings therethrough, and is preferably of reticulated cross-woven wire, and may be of any suitable mesh of material depending on the type and viscosity of the liquid to be handled. The strainer cup, though illustrated and described in preferred form as woven wire material, may also be perforated sheet material. The side wall 24 of the strainer cup is preferably of the form of an inverted conical frustum, being of greater diameter at its top which is the end connected to the downturned flange 23 of the headring 20 and conically tapered to a planar circular bottom 25 of relatively lesser diameter which is substantially parallel with the plane of the headring 20 and having obtuse angular connection to the tapered side wall as at 26.

The diametral crossbars 19 at the bottom of the cup and the resilient reinforcing spring spacers 19a comprise one or more strips of resilient material preferably bars or resilient sheet metal stamped out in strips fixedly secured to the bottom of the cup and bent so as to provide the reinforcing crossbars 19 at their central portions which underlie the bottom of the cup, and provide at their opposite end portions a plurality of extensions into resilient arcuate bow springs 19a which are thus relatively spaced about the circumference of the side wall to extend upwardly axially lengthwise externally of the lower portion of the sidewall of the cup, and are spaced from the wall thereof to the extent of the arc of the bow of the spring. Two of such crossbars and spring members are preferred at the bottom of the cup in strainers of usual size, but the number of which may be increased or decreased according to the size of the bottom of the strainer cup employed. Where two such reinforcing crossbars are employed, it is desirable that they should be relatively perpendicularly disposed. The bottom crossbar members are in close proximity to the bottom 25 of the strainer cup and preferably in superficial contact therewith to provide support for the bottom of the cup and to facilitate soldering of the bars to the cup body whereby the bow spring portions which extend up the side walls of the reticulated strainer cup are firmly supported at their bases, the terminal ends of the spacer spring members being free.

A cap closure member 29 is provided whereby the free end of the nipple may be closed when a hose or the like is not connected thereto. The cap member has its side wall internally threaded, corresponding to the external threading 11 of the nipple, and it is also provided at the underside of its top closure wall with an annular recess 30 for receiving a flat annular gasket 31 against which the machined face 14 of the end of the nipple may tightly seat to avoid any escape of liquid or gas.

In many instances it may be highly desirable to provide means for locking the closure cap on the nipple, and for such purpose the cap is provided with an external annular flange 32 having relatively circumferentially spaced holes 33 so that when the cap is threadedly seated on the nipple one of the holes 33 will overlie or substantially overlie the hole 13a in lug 13 of the nipple, whereby a suitable lock 34 may be inserted therethrough.

In Fig. 1 a hose coupling is shown connected to the nipple and strainer assembly. Any type of suitably threaded hose coupling may be employed, and the hose coupling illustrated is one form as an example, consisting of an internally threaded annular collar 35 mounted for rotation on a collar nipple 36 to which a hose 37 may be connected in the usual manner. These hose couplings are usually provided with a sealing gasket 38 against which the machined face of the strainer nipple tightly seats; and since the flange 21 of strainer head 17 seats in the recess 15 of the strainer nipple there is also a substantially tight engagement of the strainer head ring between the packing gasket of the hose coupling and the recess 15 of the strainer nipple.

In operation, it is obvious that the nipple 10 has one of its threaded end portions insertable in a suitably threaded header or receiving pipe A leading to any suitable plant or industry facility for storage. The flange 20 of the strainer head seats in the recess 15 of the strainer nipple, the crossbars 22 of the head ring serving the three purposes of transverse reinforcement for the the annular head ring, as a grill to catch and retain any large objects which may be in the flowing liquid and thus protecting the mesh strainer cup, and as a finger grip means for inserting the strainer or removing it for cleaning. As previously described, the downturned flange 23 of the annular head ring 20 serves as a means to which the top of the reticulated strainer cup may be attached. It will be noted that the strainer nipple has its opposite end portions similarly recessed and externally threaded so that it may be reversed if threads at one end become worn or deformed through injury.

The strainer cup being tapered and being inserted into an internally cylindrical nipple provides a downwardly increasing distance between the strainer cup and the inner wall of the strainer nipple to facilitate uninhibited flow of liquid through the mesh. The bottom of the strainer being flat and perpendicular to the strainer axis and substantially parallel with the plane of the head plate 20, provides a large strainer mesh area in direct line with liquid flow, and the conical taper of the sidewall of the strainer cup permits easy cleaning by inverting the cup.

The bottom transverse crossbars in substantial contact with the mesh wall of the strainer bottom furnishes transverse reinforcing support to the impact of foreign matter against the mesh of the bottom wall, and by being integral with the bow spring spacers provides rigid end supports therefor, while the bow spring members extending up the side walls of the strainer cup resiliently maintain the strainer cup substantially equally spaced from the interior cylindrical wall of the nipple, even though the nipple may be of varying internal diameter, and also provides easily slidable movement for insertion or removal of the strainer cup, since the elongated springs secured at the bottom portion of the cup compress automatically against the nipple wall as the strainer is inserted, and in removal, slide readily against the smooth uniform diameter of the inner wall of the nipple until released at the end thereof.

While in Fig. 1 the strainer assembly is herein illustrated and described as connected between the pipe and a hose coupling, it is to be understood that by reason of a separate nipple threaded at each end, the strainer assembly may also be employed between two hoses or two pipes which are suitably threaded, no special changes being required in the pipes or hoses, since the strainer assembly is a self-contained unit.

Having thus described the invention, I claim:

1. In a liquid strainer assembly, an inverted frusto-conical mesh strainer cup having at its open top a radially outwardly extended flange, said cup having a mesh bottom in a plane substantially parallel with and of lesser diameter than the top of the cup, a transverse diametral crossbar fixed to the cup underlying the bottom, the opposite end portions of the crossbar being extended and bent over at the smaller end of the cup and extending along the cup in the direction of the larger end of the cup, providing at the lower end portion of the mesh cup and exterior thereof a plurality of elongated resilient spring members relatively spaced about the circumference of the cup and adapted and arranged for spacing the lower portion of the cup from the inner wall of a tubular enclosing member.

2. In a liquid strainer assembly, an inverted frusto-conical mesh strainer cup having at its open top a radially outwardly extended flange, said flange having a diametral crossbar, said cup having a mesh bottom in a plane substantially parallel with and of lesser diameter than the top of the cup, a transverse diametral crossbar extending across the bottom of the cup and fixed to the said bottom of the cup, the opposite end portions of the crossbar being extended and bent over at the smaller end of the cup and extending along the cup in the direction of the larger end of the cup providing at the lower end portion of the mesh cup and exterior thereof a plurality of elongated resilient spring members relatively spaced about the circumference of the cup.

3. A liquid strainer assembly comprising a tubular nipple which is similarly threaded externally at each of its opposite ends, a recessed annular internal shoulder immediately adjacent one of said ends, an inverted frusto-conical mesh strainer cup within the nipple, said cup having at its open top a radially outwardly extended flange seated in said recess, said cup having a mesh bottom in a plane substantially parallel with and of lesser diameter than the top of the cup, a transverse diametral crossbar fixed to the cup underlying the bottom, the opposite end portions of the crossbar being extended and bent over at the smaller end of the cup providing at the lower end portion of the mesh cup and exterior thereof a plurality of elongated resilient spring members relatively spaced about the circumference of the cup and spacing the lower portion of the cup from the inner wall of said tubular nipple.

4. A liquid strainer assembly comprising a tubular nipple which, at each of its opposite end portions is similarly threaded externally and provided immediately adjacent the terminal of each of said ends with a similarly recessed annular internal shoulder, said nipple being of uniform internal diameter between said shoulders, in combination with an inverted frusto-conical mesh strainer cup within the nipple having at its open top a radially outwardly extended flange seated in one of said recesses, said cup having a mesh bottom in a plane substantially parallel with and of lesser diameter than the top of the cup, a transverse diametral crossbar fixed to the cup underlying the bottom, the opposite end portions of the crossbar being extended and bent over at the smaller end of the cup providing at the lower end portion of the mesh cup and exterior thereof a plurality of elongated resilient spring members relatively spaced about the circumference of the cup and spacing the lower portion of the cup from the inner wall of said tubular nipple.

ARTHUR W. RAFFERTY.

References Cited in the file of this patent

UNITED STATES PATENTS

| Number | Name | Date |
| --- | --- | --- |
| 152,652 | Knowlton | June 30, 1874 |
| 680,096 | West | Aug. 6, 1901 |
| 751,918 | Jagger | Feb. 9, 1904 |
| 920,271 | Coffin | May 4, 1909 |
| 1,436,294 | Scott | Nov. 21, 1922 |
| 1,554,924 | Shapiro | Sept. 22, 1925 |
| 1,731,085 | Warren | Oct. 8, 1929 |
| 1,971,120 | Rice et al. | Aug. 21, 1934 |

FOREIGN PATENTS

| Number | Country | Date |
| --- | --- | --- |
| 126,586 | Great Britain | of 1919 |